United States Patent [19]
Goebel

[11] 4,192,388
[45] Mar. 11, 1980

[54] WHEEL RUT CLOSING DEVICE FOR IRRIGATION SYSTEM

[75] Inventor: Larry W. Goebel, Lebanon, S. Dak.

[73] Assignee: Ray Goebel & Sons, Inc., Lebanon, S. Dak.

[21] Appl. No.: 884,685

[22] Filed: Mar. 8, 1978

[51] Int. Cl.² .................... A01B 63/04; A01B 37/00
[52] U.S. Cl. ............................ 172/463; 172/481; 172/488; 111/1; 239/212; 172/500; 172/676; 172/572
[58] Field of Search ............... 239/212, 213; 172/500, 172/134, 676, 572, 497, 498, 499, 452, 463, 481, 488

[56] References Cited

U.S. PATENT DOCUMENTS

| | | | |
|---|---|---|---|
| 523,800 | 7/1894 | Unger | 111/7 |
| 556,588 | 3/1896 | Risley | 111/7 |
| 1,518,177 | 12/1924 | Carpenter | 111/85 |
| 1,824,233 | 9/1931 | Rector | 111/85 |
| 1,833,409 | 11/1931 | Cecil | 172/156 |
| 1,886,438 | 11/1932 | Weeks | 172/676 X |
| 1,917,944 | 7/1933 | Langdon | 172/676 X |
| 2,259,874 | 10/1941 | Benjamin | 172/134 |
| 2,277,880 | 3/1942 | Noble | 172/134 |
| 2,506,430 | 5/1950 | Melvin | 111/7 |
| 2,554,604 | 5/1951 | Vetter et al. | 111/86 |
| 2,601,834 | 7/1952 | Carter | 111/7 |
| 2,620,757 | 12/1952 | Ahlen | 111/3 |
| 2,719,498 | 10/1955 | Goolsby | 111/69 |
| 2,731,928 | 1/1956 | Jackson | 111/7 |
| 3,917,171 | 11/1975 | Reinke | 239/212 X |
| 3,921,909 | 11/1975 | Hieb | 239/212 X |
| 4,131,162 | 12/1978 | Schmitz | 172/500 X |

Primary Examiner—George J. Marlo
Attorney, Agent, or Firm—Merchant, Gould, Smith, Edell, Welter & Schmidt

[57] ABSTRACT

A wheel rut closing device for use in combination with an irrigation system having an irrigation line support or supports, each support having rotatably mounted thereon a wheel or wheels. The wheel rut closing device is mounted on each irrigation line support and generally comprises an implement support frame mounted on the irrigation line support and extending generally rearwardly of the wheel, a rearwardly trailing implement holder pivotally connected to the frame, and apparatus carried by the holder for closing a wheel rut created by the wheel. A device is also provided which is connected to the frame and the holder for raising and lowering the holder to the desired height.

4 Claims, 6 Drawing Figures

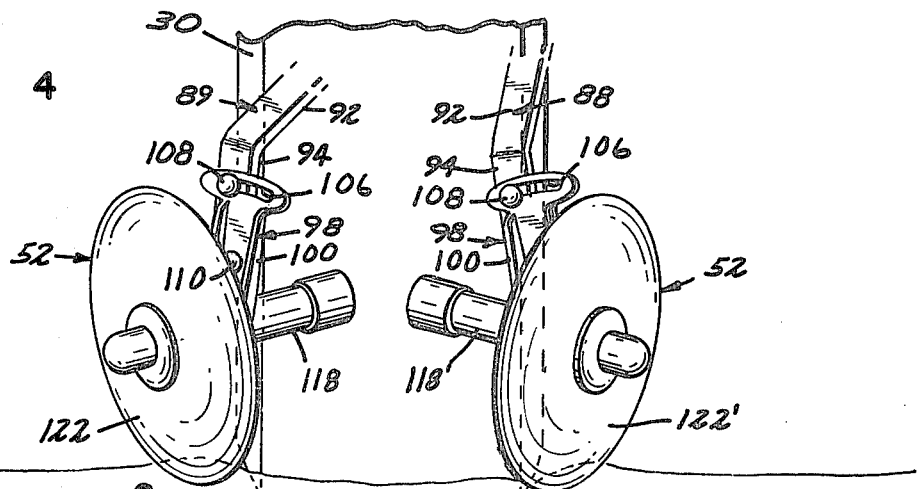
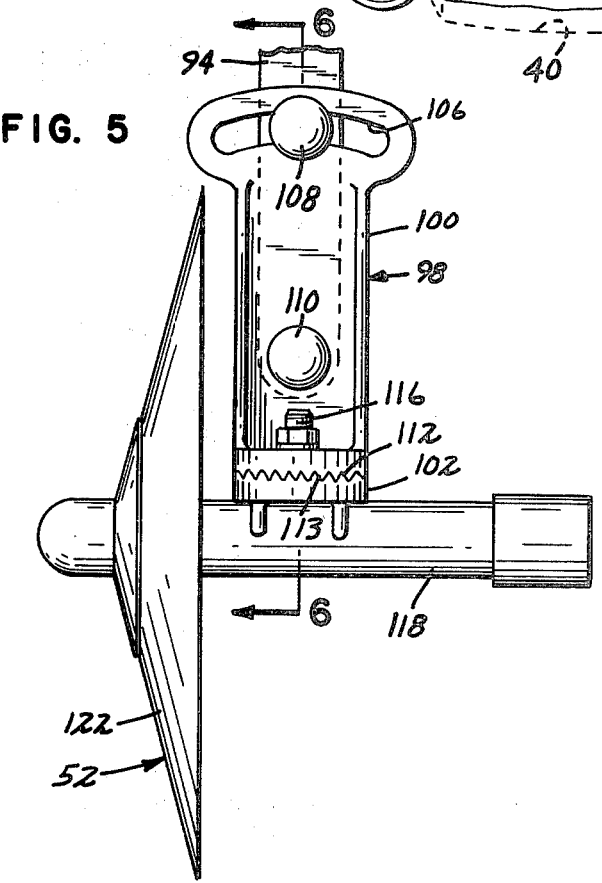
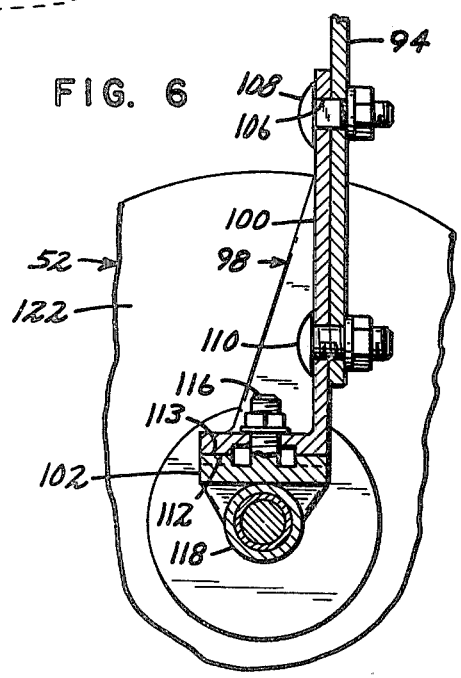

WHEEL RUT CLOSING DEVICE FOR IRRIGATION SYSTEM

BACKGROUND OF THE INVENTION

This invention relates to devices used in conjunction with an irrigation system, in particular a device for closing wheel ruts created by the system.

Irrigation lines used in irrigation systems for watering large fields and the like are generally quite massive structures. Because of the large size of the irrigation line, a number of supporting struts which are usually mounted on wheels are often required to support the irrigation line. The wheels on which the struts are mounted are also generally quite large and, depending on the weight of the irrigation line being supported, can create rather significant trenches or ruts in the field, especially when the ground is fairly soft. One such system employs ten large wheels which leave ruts which are sometimes 12-14 inches in depth. These deep trenches or ruts create a significant hazard for harvest equipment and vehicles picking up the feed. Some of the ruts created by these wheels have been of sufficient depth to upset vehicles such as a truck.

To leave these ruts untreated creates a significant problem for normal farming operations. Manual filling of the ruts is undesirable because it involves a tremendous amount of boring, time consuming hand labor. Use of a separate apparatus drawn by a tractor or other motor is also disadvantageous where a plurality of wheel ruts are created, the usual case when a large irrigation system is used.

SUMMARY OF THE INVENTION

Applicant has invented a new and useful device for use in combination with an irrigation system having an irrigation line, and an irrigation line support or supports mounted on a wheel or plurality of wheels, to close a wheel rut or ruts created by the wheel or wheels. The wheel rut closing device is mounted on each irrigation line support and generally comprises an implement support frame mounted on the irrigation line support and extending generally rearwardly of the wheel, a rearwardly trailing implement holder pivotally connected to the frame, and means carried by the holder for closing a wheel rut or ruts created by the wheel or wheels. Means connected to the frame and the holder are also provided for raising and lowering the holder to the desired height.

BRIEF DESCRIPTION OF THE DRAWING

FIG. 4 is an enlarged fragmentary rear view of the wheel rut closing means;

FIG. 5 is an enlarged fragmentary view of a portion of the wheel rut closing means; and FIG. 6 is a sectional view as seen from line 6—6 of FIG. 5.

DESCRIPTION OF THE PREFERRED EMBODIMENT

Figure 1:
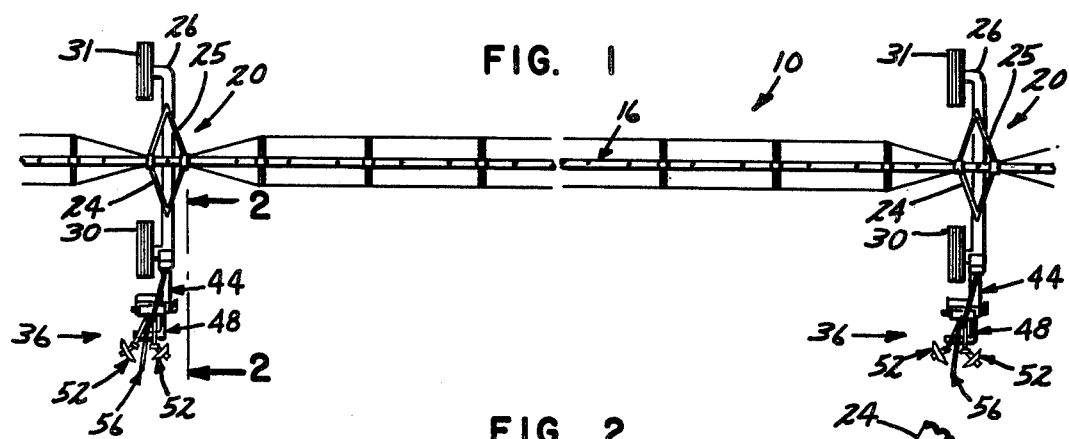
FIG. 1 is a fragmentary top plan view of an irrigation system having mounted thereon a pair of wheel rut closing devices.

As shown in FIG. 1, 10 generally designates an irrigation system for watering fields and the like. The irrigation system generally comprises an irrigation line 16 and a plurality of irrigation line supports generally designated as 20.

Figure 2:
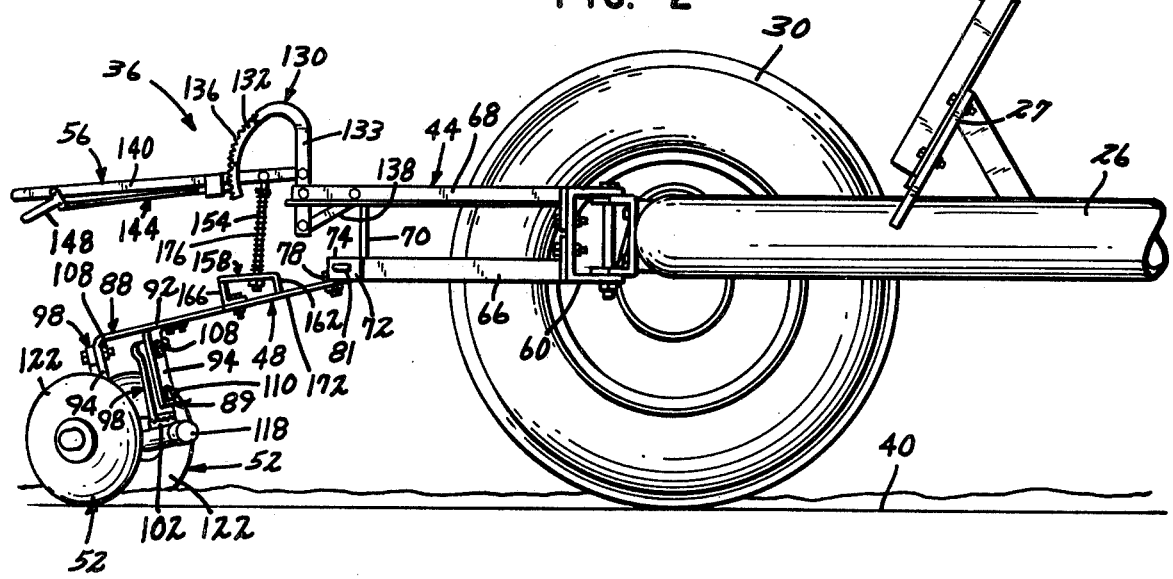
FIG. 2 is an enlarged elevational view taken along line 2—2 of FIG. 1.

As shown in FIGS. 1 and 2, support 20 generally comprises a pair of inverted V-shaped struts 24 and 25 which mount the irrigation line, the ends of the struts being secured to a generally horizontal bottom beam 26 by suitable means such as brackets 27. Rotatably mounted alongside the beam at either end thereof are a pair of wheels 30 and 31 of suitable diameter and construction for rotatably supporting irrigation line support 20.

As also shown in FIG. 2, a wheel rut closing device generally designated as 36 is mounted on the rearward end of beam 26 of each support 20 for closing a wheel rut 40 created by the wheels. Device 36 generally comprises an implement support frame 44 extending generally rearwardly of wheel 30, a rearwardly trailing implement holder 48, a pair of spaced digging implements designated as 52, and a device generally designated as 56 for raising and lowering holder 48. Frame 44 is fixedly secured to C-shaped bracket 60 and nut-bolt combinations 62 and 63. A bottom bar 66 is fixedly secured to the bottom of bracket 60 and extends generally rearwardly therefrom. A top bar 68 is fixedly secured to the top of bracket 60 and extends generally rearwardly above bottom bar 66. A brace 70 is connected to top bar 68 and to a mounting bracket 72 which is attached to and which extends transversely from near the rearward end of bottom bar 66 in a position behind rear wheel 30.

Figure 3:
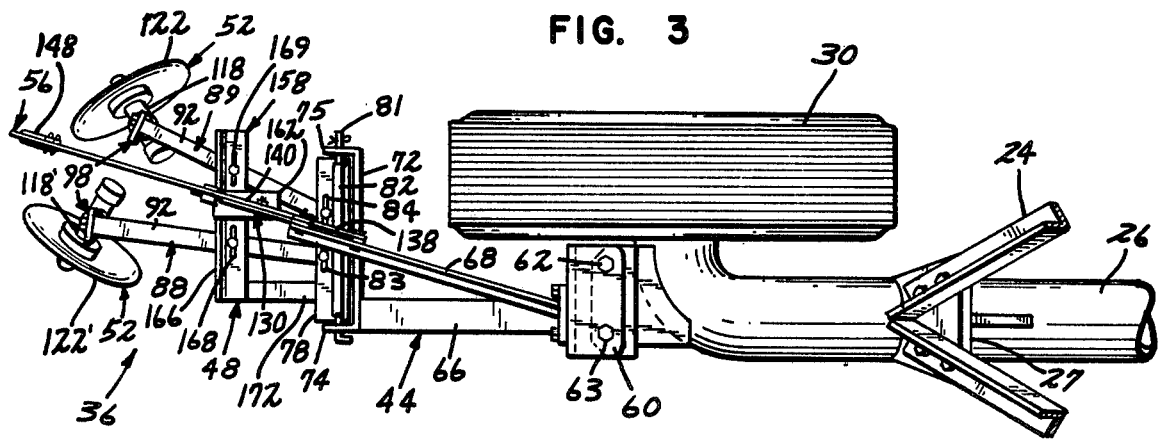
FIG. 3 is a top plan view of FIG. 2.

As shown in FIG. 3, mounting bracket 72 has holes formed in ears 74 and 75 which extend rearwardly therefrom. A member 78 has mounted thereon a cylindrical bearing 82 for reception of a pivot rod 81, the ends of the rod 81 being inserted through the holes in ears 74 and 75 for pivotal movement of member 78 about a generally horizontal axis transverse to bottom bar 66. One end of the rod is preferably bent so that it will not become detached from mounting bracket 72. A pair of elongated slots 83 and 84 are formed in member 78 to adjustably secure one end of each of a pair of L-shaped arms 88 and 89. Each arm has a generally rearwardly extending portion 92 and a generally downwardly extending portion 94.

As shown in FIGS. 4-6, an adjustable mounting bracket 98 is provided for portion 94 of each arm. As shown particularly in FIGS. 5 and 6, bracket 98 comprises a generally elongated upper portion 100 and a smaller lower portion 102. The upper end of portion 100 is provided with an arcuate slot 106. A pair of bolt-nut combinations 108 and 110 are provided for securing bracket 98 to portion 94. By loosening bolt-nut combination 108, bracket 98 may be pivoted about the axis defined by bolt-nut combination 110 through an arc defined by slot 106. Portions 100 and 102 are each provided with mating surfaces 112 and 113, respectively, which are secured together by means of bolt-nut combination 116. Portion 102 is further secured by suitable means to an elongated cylindrical member 118. A circular disc 122 of suitable size, e.g., 14 inch diameter, is rotatably mounted on member 118 for rotation about a longitudinal axis defined by member 118. As shown in FIG. 4, members 118 and 118' should be angled such that the pair of discs 122 and 122' are rearwardly converging so as to force the edges of wheel rut 40 inwardly towards the center thereof.

As shown in FIG. 2, device 56 includes an inverted J-shaped member 130 fixedly mounted on the rearward end of top bar 68 extending generally upwardly therefrom. Member 130 generally comprises a curved portion 132 and a linear portion 133 which extends slightly below top bar 68, the curved portion having formed therein over a substantial part of its periphery a plurality of notches 136. A brace 138 connects the bottom end of linear portion 133 to top bar 68 for further structural support. A lever 140 is also provided which is pivotally mounted on member 130 near the rearward end of top bar 68 and is provided with a locking mechanism generally designated as 144. Mechanism 144 is provided with a manual actuating member 148 to cause a device not shown to be inserted into and out of any one of notches 136 so as to releasably lock lever 140 at a plurality of angularly spaced positions to raise and lower holder 48 to the desired height. A rod 154 is also provided which has one end connected to lever 140, the other end of the rod being connected to a connection bracket 158 mounted on arms 88 and 89. Bracket 158 comprises an L-shaped top portion 162 having a hole not shown through which rod 154 is inserted for sliding movement, the end of the rod having threaded thereon suitable means such as a nut to prevent the rod from coming out of the hole. Bracket 158 further includes a bottom portion 166 on which top portion 162 is mounted, the bottom portion having a pair of slots 168 and 169 to which arms 88 and 89 are adjustably secured. A member 172 is also provided which connects one end of bottom portion 166 to member 78. A spring 176 surrounds rod 154 and runs substantially the length thereof between connection bracket 158 and lever 140.

In operation, the horizontal spacing of arms 88 and 89 is adjusted so that discs 122 and 122' will be positioned along the edges of rut 40 when holder 48 is lowered. Lever 140 is then moved downwardly and locked at the desired position so as to lower holder 48. The discs 122 and 122' are maintained in digging engagement due to the fact that as the discs come into contact with the ground, rod 154 slides through the hole in bracket 158 thus compressing spring 176. When compressed, spring 176 tends to exert a downwardly biasing force against bracket 158, thus serving to close the wheel rut. When it is desired to move the wheel rut closing device into an inoperative position, lever 140 is simply moved upwardly and locked at the desired position so as to raise holder 48 and thus discs 122 and 122' out of contact with the ground.

Thus, applicant has provided a useful device for closing wheel ruts created by the irrigation system with a minimum of expense and labor.

What is claimed is:

1. In an irrigation system having an irrigation line support, said support having a horizontal bottom beam, and a wheel rotatably mounted alongside the rearward end of said beam, a wheel rut closing device comprising:
    an implement support frame fixedly mounted at said rearward end of said beam, said frame having a rearwardly extending bottom bar, said bottom bar having fixedly attached at its rearward end a mounting bracket extending transversely behind said wheel, said frame further including a rearwardly extending top bar fixedly positioned above said bottom bar;
    a rearwardly trailing implement holder, said holder being pivotally connected to said mounting bracket for pivotal movement about a generally horizontal longitudinal axis transverse to said bottom bar, said holder having a pair of generally rearwardly extending horizontally spaced arms;
    a pair of circular discs for closing a rut created by said wheel, each of said discs being rotatably mounted on the rearward end of one of said arms for rotation about a longitudinal axis such that said pair of discs are rearwardly converging so as to force the edges of said rut towards the center thereof;
    a connection bracket mounted on said arms and having a hole formed therein;
    an inverted generally J-shaped member mounted on the rearward end of said top bar and extending upwardly therefrom;
    a lever pivotally mounted on said J-shaped member near said rearward end of said top bar;
    an elongated rod having one end connected to said lever, the other end of said rod extending through said hole for sliding movement therein;
    means mounted on said end of said rod extending through said hole for preventing said rod from coming out of said hole;
    a spring surrounding said rod and extending substantially the length thereof; and
    means for releasably locking said lever at a plurality of angularly spaced positions along the curved portion of said J-shaped member so that said holder can be raised and lowered to a desired height.

2. In an irrigation system having an irrigation line support, said support having a horizontal bottom beam and a wheel rotatably mounted along side the rearward end of said beam, a wheel rut closing device comprising:
    an implement support frame fixedly mounted at said rearward end of said beam, said frame having a rearwardly extending bottom bar, said bottom bar having fixedly attached at its rearward end a mounting bracket extending transversely behind said wheel, said frame further including a rearwardly extending top bar fixedly positioned above said bottom bar;
    a rearwardly trailing implement holder, said holder being pivotally connected to said mounting bracket for pivotal movement about a generally horizontal longitudinal axis transverse to said bottom bar, said holder having a pair of generally rearwardly extending horizontally spaced arms;
    a pair of circular discs for closing a rut created by said wheel, each of said discs being rotatably mounted on the rearward end of one of said arms for rotation about a longitudinal axis, so that said pair of discs are rearwardly converging and transversely spaced, whereby to force the edges of said rut toward the center thereof;
    and means for varying the pivotal relation between said implement holder and said mounting bracket to vary the height of said discs relative to said beam.

3. Apparatus according to claim 2 in which the last named means comprises means releasably locking said holder in a plurality of pivotal positions with respect to said mounting bracket.

4. Apparatus according to claim 2 and means in said implement holder for varying the transverse location of said discs with respect to each other and to said support frame.

* * * * *